United States Patent
Kabbani et al.

(10) Patent No.: US 9,246,760 B1
(45) Date of Patent: Jan. 26, 2016

(54) SYSTEM AND METHOD FOR REDUCING THROUGHPUT LOSS RESPONSIVE TO NETWORK EXPANSION

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 13/904,804

(22) Filed: May 29, 2013

(51) Int. Cl.
*H04L 12/28* (2006.01)
*H04L 12/24* (2006.01)

(52) U.S. Cl.
CPC .................................... *H04L 41/082* (2013.01)

(58) Field of Classification Search
CPC .............. H04L 2012/44; H04L 2012/445; H04L 2012/46; H04L 2012/5609; H04L 49/10; H04L 49/101; H04L 49/102; H04L 49/15; H04L 45/02; H04L 45/10; H04L 41/04
USPC ................................................. 370/254, 255
See application file for complete search history.

(56) References Cited

U.S. PATENT DOCUMENTS

| | | | |
|---|---|---|---|
| 6,094,417 A | 7/2000 | Hansen et al. | |
| 6,626,586 B1 | 9/2003 | Jaeger | |
| 6,711,324 B1 | 3/2004 | Zang et al. | |
| 7,606,494 B1 | 10/2009 | Weston-Dawkes et al. | |
| 7,830,789 B2 | 11/2010 | Hashiguchi et al. | |
| 8,195,784 B2 | 6/2012 | Smith et al. | |
| 8,370,490 B2 | 2/2013 | Deng et al. | |
| 8,660,010 B2 | 2/2014 | Zolfaghari et al. | |
| 2002/0027885 A1* | 3/2002 | Ben-Ami | 370/254 |
| 2005/0002603 A9 | 1/2005 | Beshai et al. | |
| 2005/0033742 A1* | 2/2005 | Kamvar et al. | 707/7 |
| 2006/0153496 A1 | 7/2006 | Tanobe et al. | |
| 2010/0129078 A1 | 5/2010 | Weston-Dawkes et al. | |
| 2010/0266281 A1 | 10/2010 | Wang et al. | |
| 2011/0176804 A1 | 7/2011 | Biinkert et al. | |
| 2012/0008945 A1 | 1/2012 | Singla et al. | |
| 2012/0128354 A1 | 5/2012 | Panwar et al. | |
| 2012/0182865 A1 | 7/2012 | Andersen et al. | |
| 2013/0083701 A1 | 4/2013 | Tomic et al. | |
| 2013/0308444 A1 | 11/2013 | Sem-Jacobsen, et al. | |
| 2014/0270762 A1 | 9/2014 | Li et al. | |

FOREIGN PATENT DOCUMENTS

WO   WO-2013/091688 A1   6/2013

OTHER PUBLICATIONS

Curtis, et al. Rewire: An Optimization-based Framework for Unstructured Data Center Network Design, IEEE, 9 pages, 2012.

(Continued)

*Primary Examiner* — Pao Sinkantarakorn
*Assistant Examiner* — Stephen Steiner
(74) *Attorney, Agent, or Firm* — Edward A. Gordon; Foley & Lardner LLP (57) ABSTRACT

Systems and methods for reassigning and implementing communication links in a network are described herein. The systems and methods described herein, reduce the amount of throughput loss that results when a network is expanded. The systems and methods generate distributions for the communication links that, when implemented, reduce the number of broken paths that occur in the expanding network. More practically, the systems and methods provide a heuristic for remapping communication links from a first link distribution to a second link distribution.

18 Claims, 6 Drawing Sheets

(56) References Cited

OTHER PUBLICATIONS

Farrington et al. Helios: A Hybrid Electrical/Optical Switch Architecture for Modular Data Centers, Proceedings of the ACM SIGCOMM Conference, Aug. 30013 Sept. 3, 2010, New Delhi, India (12 pages).

Thiagarajan et al., "Capacity Fairness of Wdm Networks with Grooming Capabilities" OptiComm 2000: Optical Network and Communications, Proceedings of SPIE vol. 4223, Sep. 2000, 11 Pages.

US Notice of Allowance in U.S. Appl. No. 13/872,630 DTD Mar. 23, 2015.

US Office Action in U.S. Appl. No. 13/872,626 DTD Apr. 16, 2015.

US Office Action in U.S. Appl. No. 13/872,626 dated Dec. 8, 2014.

US Office Action in U.S. Appl. No. 13/872,630 dated Nov. 18, 2014.

US Notice of Allowance in U.S. Appl. No. 14/166,011 DTD May 22, 2015.

US Notice of Allowance in U.S. Appl. No. 13/872,626 DTD Jun. 29, 2015.

US Notice of Allowance in U.S. Appl. No. 13/872,630 DTD Jul. 20, 2015.

US Notice of Allowance in U.S. Appl. No. 14/166,011 DTD Jul. 22, 2015.

\* cited by examiner

|     | [0] | [1] | [2] | [3] | [4] |
| --- | --- | --- | --- | --- | --- |
| [4] | 26  | 25  | 25  | 26  | 26  |
| [3] | 25  | 25  | 26  | 26  | 26  |
| [2] | 25  | 26  | 26  | 26  | 25  |
| [1] | 26  | 26  | 26  | 25  | 25  |
| [0] | 26  | 26  | 25  | 25  | 26  |

|     | [0] | [1] | [2] | [3] |
| --- | --- | --- | --- | --- |
| [3] | 32  | 32  | 32  | 32  |
| [2] | 32  | 32  | 32  | 32  |
| [1] | 32  | 32  | 32  | 32  |
| [0] | 32  | 32  | 32  | 32  |

| D[0] | [(0,0), (1,1), (2,2), (3,3)] |
|------|------------------------------|
| D[1] | [(0,1), (1,2), (2,3), (3,0)] |
| D[2] | [(0,2), (1,3), (2,0), (3,1)] |
| D[3] | [(0,3), (1,0), (2,1), (3,2)] |

*Figure 3C*

| D[0] | [(0,0), (1,1), (2,2), (3,3), (4,4)] |
|------|-------------------------------------|
| D[1] | [(0,1), (1,2), (2,3), (3,4), (4, 0)] |
| D[2] | [(0,2), (1,3), (2,4), (3,0), (4, 1)] |
| D[3] | [(0,3), (1,4), (2,0), (3,1), (4, 2)] |
| D[4] | [(0,4), (1,0), (2,1), (3,2), (4, 3)] |

SYSTEM AND METHOD FOR REDUCING THROUGHPUT LOSS RESPONSIVE TO NETWORK EXPANSION

BACKGROUND

Hybrid optical and electrical switches have been suggested to facilitate building modular data centers. However, when the connections maintained by these switches are broken responsive to the expansion of the data center's network, data throughput loss can occur.

SUMMARY OF THE DISCLOSURE

Aspects and implementations of the present disclosure are directed to systems and methods for reducing data throughput loss during network expansion.

According to one aspect of the disclosure, a system for reassigning and implementing communication links in a network includes a memory to store processor-executable instructions and a processing unit. When executed by the processing unit, the processor-executable instructions cause the processing unit to receive a request to expand a network by at least one node. The network has a first link distribution that is defined by a first link matrix. The link matrix includes a plurality of circular diagonals. The processor-executable instructions also cause the processor to determine a second link distribution defined by a second link matrix. The second link matrix also has a plurality of circular diagonals. Next, the processor-executable instructions cause the processor to remap a first subset of the communication links associated with each of the first link matrix's plurality of circular diagonals to the second link matrix's plurality of circular diagonals. This process leaves a second subset of the communication links unmapped. Then, the processor remaps the second subset of communication links to a single circular diagonal of the of the second link matrix, and finally the set number of communication links are physically reassigned to match the second link configuration matrix.

According to another aspect of the disclosure, a computer implemented method for reassigning and implementing communication links in a network includes receiving a request to expand a network by at least one node. The network has a first link distribution defined by a first link matrix. The link matrix includes a plurality of circular diagonals. The method also includes determining a second link distribution defined by a second link matrix. The second link matrix also has a plurality of circular diagonals. The method further includes remapping a first subset of the communication links associated with each of the first link matrix's plurality of circular diagonals to the second link matrix's plurality of circular diagonals. The remapping leaves a second subset of the communication links unmapped. The second subset of communication links are then remapped to a single circular diagonal of the of the second link matrix. The method concludes with the physical implementation of the communication links to match the second link configuration matrix.

Yet another aspect of the disclosure relates to a non-transitory computer readable storage medium having instructions encoded thereon which, when executed by a processor, cause the processor to perform a method of reassigning and implementing communication links in a network. The network has a first link distribution defined by a first link matrix. The link matrix includes a plurality of circular diagonals. The method includes determining a second link distribution defined by a second link matrix. The second link matrix also has a plurality of circular diagonals. The method further includes remapping a first subset of the communication links associated with each of the first link matrix's plurality of circular diagonals to the second link matrix's plurality of circular diagonals. The remapping leaves a second subset of the communication links unmapped. The second subset of communication links are then remapped to a single circular diagonal of the of the second link matrix. The method concludes with the physical implementation of the communication links to match the second link configuration matrix.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, systems and methods for reducing throughput loss during the expansion of a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
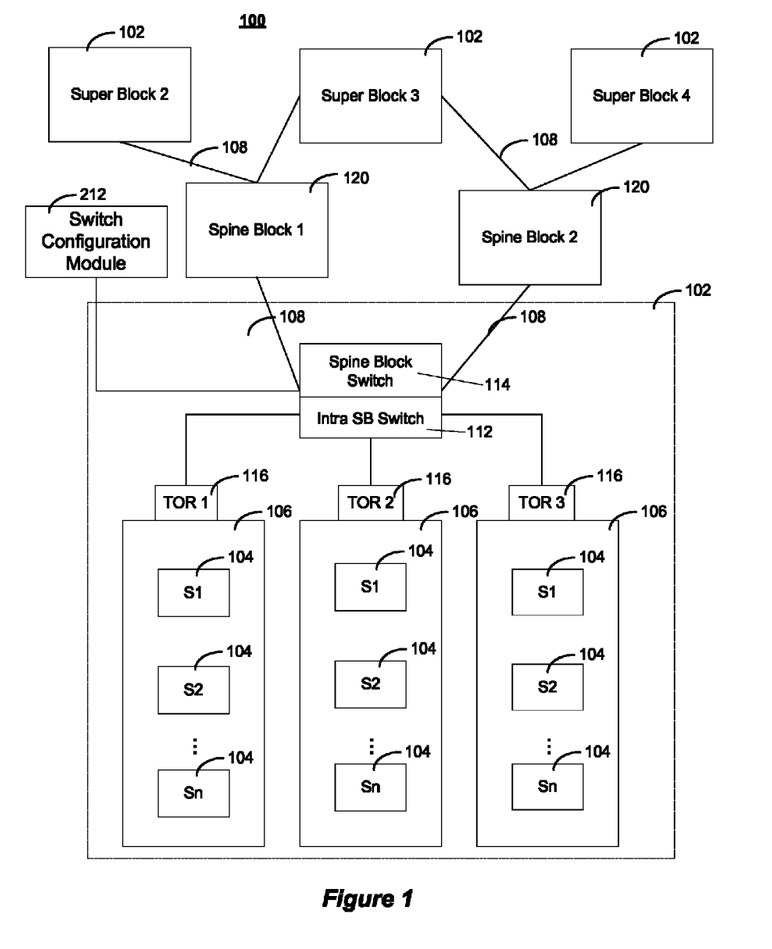
FIG. 1 is a diagram of a data center, according to an illustrative implementation.

FIG. 1 is a block diagram of an example data center 100. The data center 100 includes several interconnected superblocks 102 (also referred to as "pods"). Each superblock 102 may include many hundred, and in some implementations over one thousand, servers 104 arranged in server racks 106. The superblocks 102 are communicatively coupled to one another by optical and/or electrical communication links 108. They can be connected directly, or through spineblocks 120, which serve as switches for routing data communications between the superblocks 102. Each superblock 102 includes an intra-superblock switch 112 for routing communications among the racks 106 included in the superblock 102 or to a spineblock switch 114, which routes data communications between superblocks 102 through spineblocks 120. In some implementations, the spineblock switch 114 can be a spineblock or it can be switch within the superblock 102.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers within the rack to the intra-superblock switch 112.

The data center 100 also includes a switch configuration system 210. The switch configuration system 210 is described further in relation to FIG. 2, but briefly, the configuration system 200 controls how switches in the data center 100 (e.g., a spineblock switch 114) connect the superblocks 102 to spineblocks 120. In some implementations, the configuration system 200 is a component of, or is in communication with, the spineblock switch 114. The components of the switch configuration system 210 can be implemented by special purpose logic circuitry (e.g., an FPGA (field programmable gate array), an ASIC (application-specific integrated circuit)) or a general purpose computing device.

Figure 2:
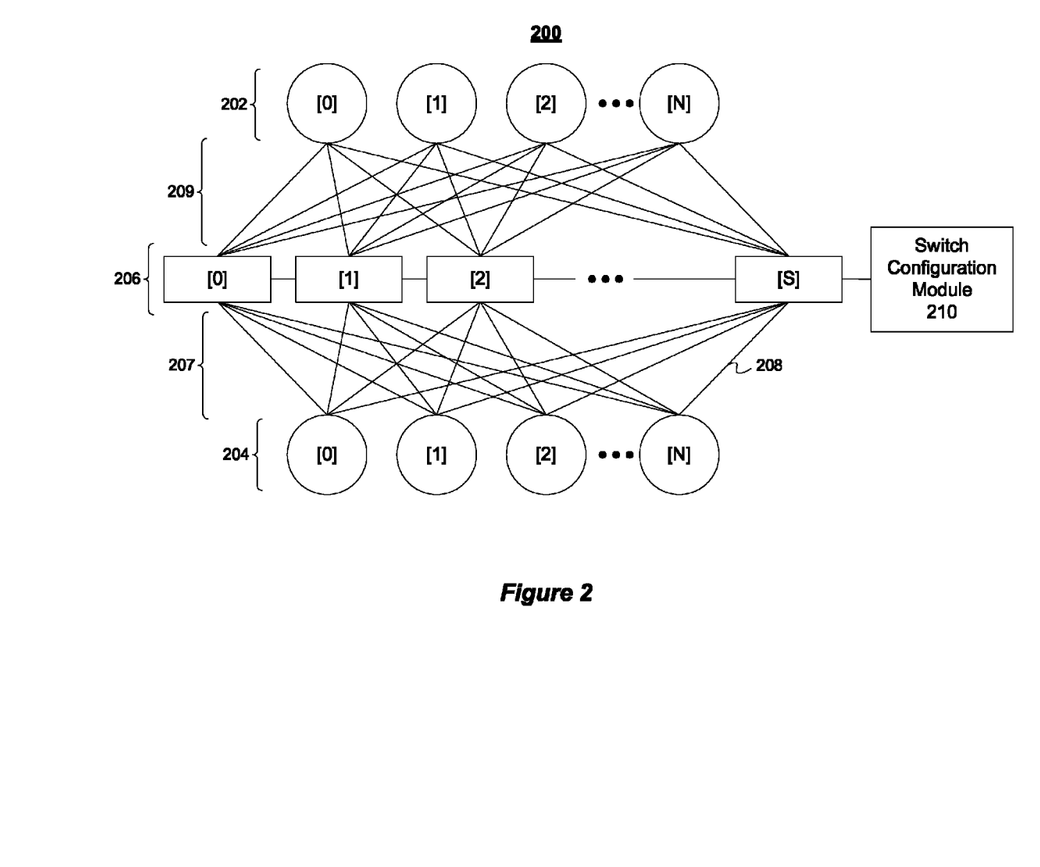
FIG. 2 is block diagram of an example network 200, according on an illustrative implementation.

FIG. 2 is an example network 200, according on an illustrative implementation. Network 200 includes superblocks 204[0-N] and spineblocks 202[0-N]. The switches 206[0-S] couple spineblock connected links 209 to superblock connected links 207. The spineblock connected links 209 and superblock connected links 207 are collectively referred to as communication links 208. The switch configuration system 210 controls to which spineblock connected link 208' each superblock connected link 208 is coupled. In some implementations, the spineblocks 202[0-N], superblocks 204[0-N], links 208, and/or switches 206[0-S] are similar to, or the same as, the spineblocks 120, superblocks 102, links 108, and spineblock switches 114 of the above described data center 100.

The switch configuration system 210 configures and manages the paths between the superblocks 204[0-N] and spineblocks 202[0-N]. A path is a connection between a spineblock 202 and a superblock 204. A path includes one superblock connected link 208, one switch 206, and one spineblock connected link 208'. The switch configuration system 210 determines the link 208 distributions when a superblock 202 and/or spineblock 204 is added to the data center 100. A data link distribution is a logical representation of all the links 208 between the superblocks 202[0-N] and spineblocks 204[0-N]. As described in relation to FIG. 5, the switch configuration system 210 determines new links distributions that when implemented reduce throughput loss during network expansion. Throughput loss occurs when a path is broken or disrupted. The physical reassignment of links 208 results in broken paths. Therefore, throughput loss is reduced during network expansion by reducing the number of paths broken (or disrupted) during network expansion.

In some implementations, the switches 206[0-S] are optical circuit switches. Optical circuit switches allow for the network topology (i.e., the paths) to be changed in a programmable way. For example, a non-optical switch may require cables to be physically disconnected and reconnected from the switches to change a network's topology. Optical switches include configurable, internal connections between the switch's spineblock facing ports and superblock facing ports. For example, each superblock facing port of the optical switch is connected to a programmable fiber optic relay switch. When a superblock 202, connected to a first superblock facing port, needs to be connected to a new spineblock 204, the switch configuration system 210 sends a control signal to the first superblock facing port's fiber optic relay switch to cause the fiber optic relay switch to direct traffic to the spineblock facing port of the new spineblock 204. By controlling the internal connections of the optical switch, the switch configuration system 210, can reconfigure the network topology without the need for physical unplugging and plugging of cables into the switch 206.

In some implementations of the network 200, the number of spineblocks 202[0-N] and superblocks 204[0-N] is variable, and new superblocks 204 and new spineblocks 202 are added to the network 200 in pairs. In some implementations, there is always an equal number of superblocks 204[0-N] and spineblocks 202[0-N]. In other implementations, a spineblock 202 and/or a superblock 204 may be added or removed from the network 200 without the addition or removal of a respective superblock 204 and/or spineblock 202.

In some implementations, the number of switches 206 is fixed for the network 200 (i.e., S is constant when N increases). For example, a spineblock 202/superblock 204 pair may be added to the network 200 without adding an additional switch 206. In other implementations, the number of switches is increased with the addition of superblocks 204 and/or spineblocks 202. The switches 206[0-S] of network 200 can be configured to connected a variable number of superblocks 204[0-N] and/or spineblocks 202[0-N].

In some implementations, the switches 206[0-S] have a fixed number of ports and therefore may only be connected to a fixed number of communication links 208. The number of communication links 208 connected to a spineblock 202, superblock 204, or switch 206 is denoted by L. In some implementations, due to the limited number of ports on a switch 206, as the network 200 expands, a switch 206 is connected to a smaller percentage of the superblocks 204 and spineblocks 202 in the expanding network 200. For example, consider a network that includes five spineblocks 202, five superblocks 204, and five switches 206 (i.e., N=S=4). The spineblocks 202[0-4] and superblocks 204[0-4] each have five ports (i.e., L=5). In the initial configuration of this example network, each switch 206[0-4] is connected to each spineblock 202[0-4] and each superblock 204[0-4]. If the network was expanded such that N=9, each switch 206[0-4] would continue to have only five spineblock connections and five superblock connections. The resulting communication link configuration would have each switch 206[0-4] connected to only half of the spineblocks 202 and half of the superblocks 204.

In some implementations, the fixed number of spineblock and superblock facing ports results in the disruption of paths between the superblocks 204[0-N] and spineblocks 202[0-N] when a new spineblock 202 and/or a new superblock 204 is added the network 200. In the above example, each switch 206[0-4] is initially connected to superblocks 204[0-4]. When five additional superblocks 204[5-9] are added to the example network, a switch 206 cannot support a connection to each of the superblocks 204[0-9] and each of the spineblocks 202[0-9]. In this example, a switch 206 may be reconfigured to connect to superblocks 204[0, 2, 4, 6, 8]. In this example, the connection between the switch 206 and superblocks 204[1, 3, 5] were broken and therefore paths containing those links 208 were disrupted.

Figure 3A:
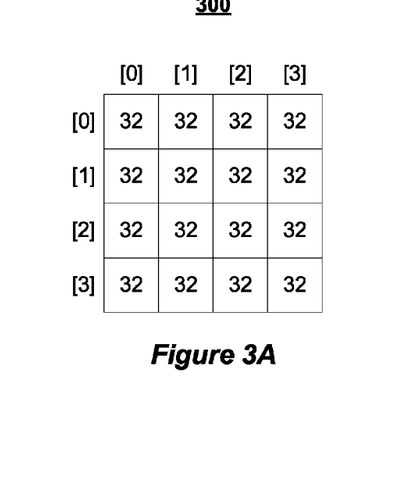
FIGS. 3A and 3B are examples of link matrices, according to an illustrative implementation.
Figure 3B:
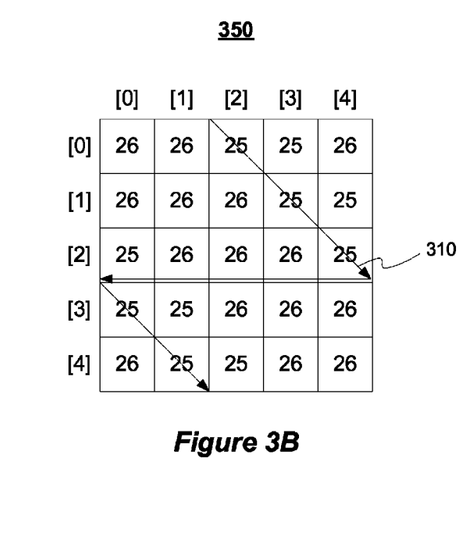

FIGS. 3A and 3B illustrate two link matrices 300 and 350, respectively, according to an illustrative implementation. A link matrix ($d_N$) is a logical representation of the distribution of links 208 connecting the spineblocks 202[0-N] and superblocks 204[0-N] in the network 200. The link matrix 300 is for a network where N=3 and L=128, and link matrix 350 is for the same network after it has been expanded by one superblock 204/spineblock 202 pair (i.e., N is now equal to 4). Applying these conditions to the network 200 of FIG. 2, the link matrix 300 corresponds to the network 200 when the network 200 contains four spineblocks 202[0-3] connected to four superblocks 204[0-3] through 128 switches 206[0-127]. The link matrix 350 corresponds to the network 200, when the network 200 contains five spineblocks 202[0-4] connected to five superblocks 204[0-4] through 128 switches 206[0-127].

In a link matrix, the spineblocks 202[0-N] of the network 200 are represented as the columns of the link matrix $d_N$, and the superblocks 204[0-N] of the network 200 are represented as the rows of the link matrix $d_N$. The value at each link matrix cell ($d_{i,j}$) is the number of paths (P) that connect the superblock 204[i] to the spineblock 202[j]. In some implementations, such as those illustrated in link matrix 300 and link matrix 350, each spineblock 202 and superblock 204 has the same total number of paths. In a link matrix, the total number of paths for a superblock 204 or spineblock 202 can be calculated by summing the values in the superblock 204's row or by summing the values in the spineblock's 202 column. For example, in link matrix 300 the spineblock 202[1] has 32 paths to the superblock 204[1], 32 paths to the superblock 204[2], 32 paths to the superblock 204[3], and 32 paths to the superblock 204[4], for a total of 128 paths.

As described above, FIG. 3B illustrates a second link matrix 350 that corresponds to the expansion of link matrix 300. As the network associated with the link matrix 300 and the link matrix 350 expands, the number switches 206 in the network remains constant. Therefore, the number of paths to each superblock 202 and spineblock 202 remains the same. The constant number of paths is depicted by each column and row of link matrix 350 still summing to equal 128. The link matrix 350 also illustrates the above described condition where the number of paths between a superblock 204 and spineblock 202 is reduced when the network is expanded. In link matrices 300 and 350, the spineblock 202[1] and superblock 204[1] were initially connected by 32 paths; however, when a new superblock 204/spineblock 202 pair is added to the network 200, the number of paths from spineblock 202[1] to superblock 204[1] was reduced.

In the link matrices 300 and 350, the paths connecting the superblocks 204[0-N] and spineblocks 202[0-N] have a substantially even distribution across the network. In some implementations, a substantially even distribution of paths occurs when each link matrix cell value $d_{ij}$ is P or P+1. P is equal to floor(L/(N+1)), where floor(x) is the largest integer less than or equal to x. Determining a substantially even distribution of the paths is discussed further in relation to the method of FIG. 5.

Figure 3C:
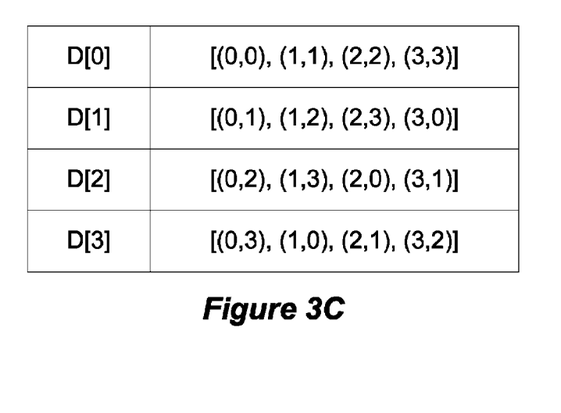
FIGS. 3C and 3D are tables listing the circular diagonals of the link matrices of FIGS. 3A and 3B, respectively, according to one illustrative implementation.

Each matrix having n rows and m columns also has (n+m−1) diagonals. When, as in the link matrix 300 and the link matrix 350, m=n=N, the matrix also has N number of circular diagonals (D[i]). The diagonals include the (n−1) diagonals below the main diagonal and the (m−1) diagonals above the main diagonal. For example, the diagonals of link matrix 300 include: a main diagonal beginning at $d_{0,0}$, the diagonals below the main diagonal beginning at $d_{1,0}$, $d_{2,0}$, and $d_{3,0}$, and the diagonals above the main diagonal beginning at $d_{0,1}$, $d_{0,2}$, and $d_{0,3}$. Each circular diagonal D[i] starts in the first row, with $d_{0,j}$ being the first element of the circular diagonal D[i]. The circular diagonal D[i] follows a diagonal path from $d_{0,j}$ and wraps to the first column after encountering the last column of the link matrix. For example, the arrow 310 traces the circular diagonal D[2] of matrix 350. The indices of link matrix 350 that correspond to the circular diagonal D[2] are [(0, 1), (1, 4), (2, 0), (3, 1), (4, 2)]. The charts 360 and 370, illustrated in FIGS. 3C and 3D respectively, provide the matrix cell values $d_{i,j}$ for all the circular diagonals of the link matrices 300 and 350, respectively.

Figure 3D:
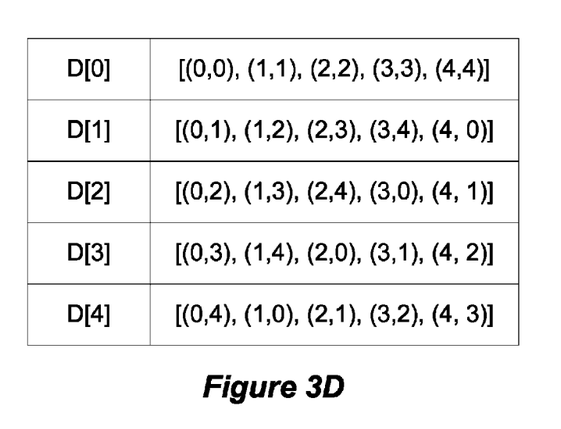

In some implementations, as illustrated in the link matrices 300 and 350, all the matrix cell values $d_{i,j}$ of a circular diagonals D[i] are identical. Using the above described equations for the value P, each entry of the circular diagonals D[i] for link matrix 300 is 32 (i.e, P=floor(L/(N+1))=floor(128/(3+1)) =32). In the link matrix 350, each circular diagonal D[i] includes only the matrix cell values 25 or 26 (i.e., P=floor(L/(N+1))=floor(128/(4+1))=25 and P+1=25+1=26). In some implementations, having identical values for the entries of a diagonal matrix causes the path distribution to be substantially even. For example, placing the value of 25 in the third and fourth circular diagonal ensures that each of the spineblocks 202 is only connected to two superblocks 204 through 25 paths. In some implementations, the values in a circular diagonal D[i] indicate the number of switches 206 that are assigned to manage the paths of the circular diagonal D[i]. For example, and referring to link matrix 350 and table 370, a block of twenty-five switches 206 (e.g., switches 206 [0-24]) is assigned to manage the paths between spineblock 202[2] and superblock 204[0], between spineblock 202[3] and superblock 204[1], between spineblock 202[4] and superblock 204[2], between spineblock 202[0] and superblock 204[3], and between spineblock 202[1] and superblock 204[4]. In some implementations, assigning blocks of switches 206 to manage the paths of the circular diagonal D[i] substantially evenly distributes the paths across the network 200.

Figure 4:
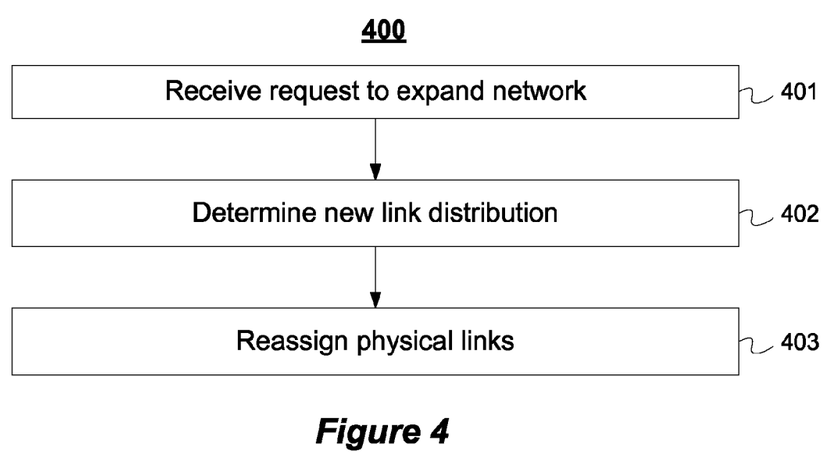
FIGS. 4 and 5 are flow charts of methods for reducing throughput loss when expanding a network similar to the network of FIG. 2, according to one illustrative implementation.

FIG. 4 is a flow chart of a method 400 for reducing throughput loss when expanding a computer network, according to one illustrative implementation. In general the method 400 includes receiving a request to expand a network (step 401). In some implementations, a request to expand a network is generated responsive to increased demand on a network or data center 100. Next, a new link distribution is determined for the expanded network (step 402). As described above, the switch configuration system 210 determines a link distribution that when physically implemented in the data center 100 reduces the number of broken paths. Then, the links of the data center 100 are physically reassigned to match the new link distribution (step 403). In some implementations, the switch configuration system 210 physically reassigns the links by controlling the internal connections between a switch's spineblock facing ports and superblock facing ports.

Figure 5:
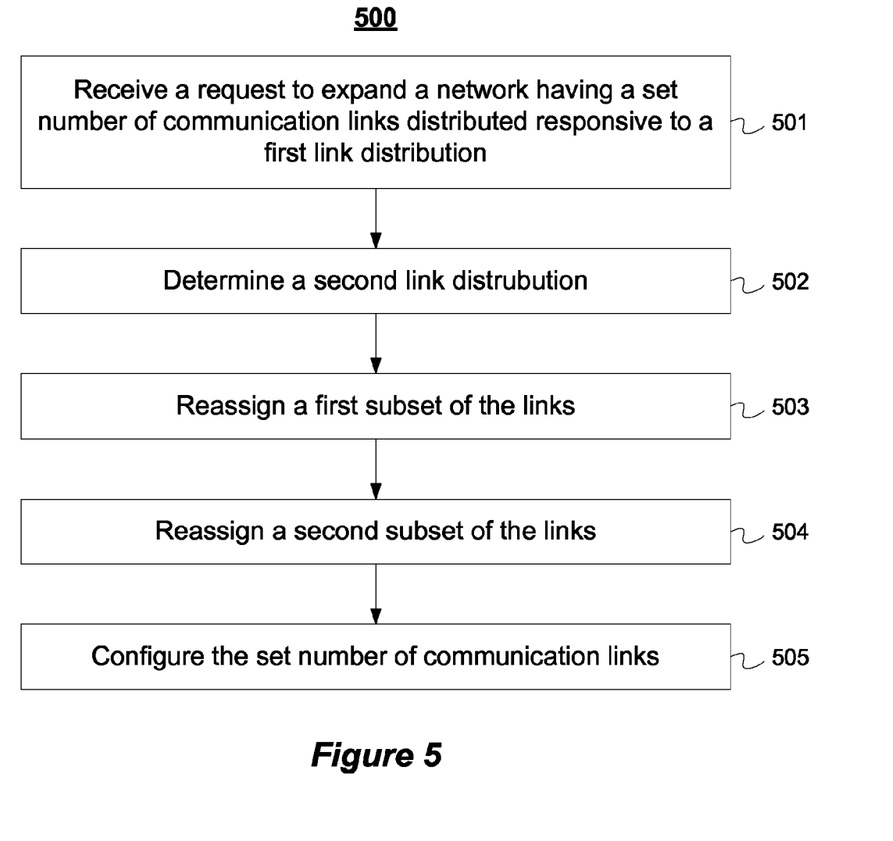

FIG. 5 is a flow chart of a method 500 for reducing throughput loss when expanding a computer network, according to one illustrative implementation. The method 500 is a specific implementation of the method 400. In general the method 500 includes receiving a request to expand a computer network having a first distribution of communication links and a first link configuration matrix (step 501). The method 500 expands on the step 402 of method 400 by determining a second distribution of the communication links (step 502), mapping a first subset of links associated with the circular diagonals of the first link configuration matrix to a second link matrix (step 503), and then remapping a second subset of links associated with the circular diagonals of the first link to the second link matrix (step 504). Finally, the communication links are physically reassigned to match the link distribution of the second link configuration matrix (step 505).

As set forth above, and mirroring step 401 of method 400, the method 500 begins with the receipt of a request to expand the computer network (step 501). In some implementations, the request is received by the switch configuration system 210. The request may be automatically generated when a spineblock 202 and/or superblock 204 comes online, and/or the request may be generated by a human operator when the network is expanded. In other implementations, the switch configuration system 210 may monitor the network 200 for network changes, and responsive to detecting the expansion of the network implement the method 500 described herein. In some implementations, the expansion of the network 200 includes expanding the network 200 by an equal number of spineblocks 202 and superblocks 204. As described above, the communication links 208 of the network 200 have a determined first distribution defined by the a first link matrix.

After receiving the request to expand the computer network, a second link distribution, as defined by a second link matrix, is determined (step 502). In some implementations, determining the second link distribution of the second link matrix includes creating a substantially even distribution of the communication links 208 across the network. As described above, a substantially even distribution refers to each link matrix cell value $d_{ij}$ being P or P+1. In some implementations, the second link matrix is defined such that the main diagonal of the second link matrix includes the P+1 values. In implementations with more than one P+1 circular diagonal, the additional P+1 circular diagonals are placed immediately above and below the main diagonal. This is illustrated in link matrix 350, where the P+1 circular diagonals are placed along the main diagonal, the circular diagonal (D[1]) immediately above main diagonal, and the circular diagonal (D[4]) immediately below the main diagonal. Having the P+1 values in the main diagonal increases the number of paths that may be mapped directly from the first link matrix to the second link matrix, and thereby decreasing the number of disrupted paths.

Then, a first subset of the links associated with each of the first link matrix's circular diagonals is remapped to the circular diagonals of the second link matrix (step 503). As described above, the link matrix provides a logical representation of the number of paths connecting each of the superblocks 204[0-N] and spineblocks 202[0-N]. Based on the values in the link matrix diagonals, switches 206 are assigned to make the appropriate connections between the superblocks 204[0-N] and superblocks 204[0-N].

In some implementations, the throughput loss is reduced by remapping as many of the switches 206[0-S] associated with the circular diagonals of the first link matrix to the circular diagonals of the second link matrix. In some implementations, the remapping of the switches 206[0-S] is achieved by remapping switches 206 from D[i] of $d_N$ to D[i] of $d_{N+1}$ for i between 0 and N/2, and remapping switches 206 from D[i] of $d_N$ to D[i+1] of $d_{N+1}$ for i between (N/2+1) and (N−1).

Referring to the link matrices 300 and 350 as an example, in the initial condition each spineblock 202[0-3] and superblock 204[0-3] is connected to 128 paths and the network contains 128 switches 206 [0-127]. As illustrated by link matrix 300, thirty-two switches 206 are assigned to connect the paths associated with each circular diagonal of link matrix 300. Furthering the initial conditions of this example, assume switches 206[0-31] are assigned to make the connections of D[0]. As defined by the link matrix 300, D[0] includes the connections between spineblock 202[0] and superblock 204[0], spineblock 202[1] and superblock 204[1], spineblock 202[2] and superblock 204[2], spineblock 202[3] and superblock 204[3]. Switches 206[32-63] are assigned the connections of D[1], switches 206[64-95] are assigned the connections of D[2], and switches 206[96-127] are assigned the connections of D[3]. FIG. 3A illustrates a tally of these assignments.

Using the above remapping equations, the twenty-six switches 206[0-25] of $d_N$'s D[0] are directly remapped to $d_{N+1}$'s D[0], the twenty-six switches 206[32-57] of $d_N$'s D[1] are remapped to $d_{N+1}$'s D[1], the twenty-five switches 206 [64-88] of $d_N$'s D[2] are remapped to $d_{N+1}$'s D[2], and the twenty-six switches 206[96-121] of $d_{N+1}$'s D[3] are remapped to $d_{N+1}$'s D[4].

This step of the remapping process results in the disruption of 102 paths. As an example of the disrupted paths, consider the remapping of $d_N$'s D[1] to $d_{N+1}$'s D[1]. Referring to the link matrices 300 and 350, the circular matrix D[1] of $d_N$ is [(0, 1), (1, 2), (2, 3), (3, 0)] and the circular matrix D[1] of $d_{N+1}$ is [(0, 1), (1, 2), (2, 3), (3, 4), (4, 0)]. As depicted by the circular diagonals D[1] of the link matrices 300 and 350, the twenty-six switches 206[0-25] associated with both circular diagonals D[1] connect superblock 204[0] to spineblock 202 [1], superblock 204[1] to spineblock 202[2], and superblock 204[2] to spineblock 202[3]. In link matrix 300, the switches 206[0-25] are responsible for connecting superblock 204[3] to spineblock 202[0], but in link matrix 350 they are now responsible for connection superblock 204[3] to spineblock 202[4]. Thus, the configuration of the paths previously to spineblock 202[0] which are now connected to spineblock 202[4] results in 26 disrupted paths. This process can be repeated for each of the diagonals D[i] to determine the total number of disrupted paths.

Next, a second subset of links associated with the circular diagonals of the first link matrix is remapped to a single circular diagonal of the second link matrix (step 504). Similar to the remapping described above, switches 206 associated with the circular diagonals of the first link matrix are remapped to the circular diagonals of the second link matrix. In some implementations, the second subset of links includes all links that were not previously remapped with the first subset. In some implementations, the remaining switches 206 are remapped to $d_{N+1}$'s D[N/2+1] circular diagonal. Continuing the above example, the remaining twenty five switches are remapped to $d_{N+1}$'s D[3] circular diagonal. For example, the six switches 206[27-32] originally assigned to $d_N$'s D[0], the six switches 206[58-63] originally assigned to $d_N$'s D[1], the seven switches 206[89-95] originally assigned to $d_N$'s D[2], and the six switches 206[123-127] originally assigned to $d_N$'s D[3] are remapped to $d_{N+1}$'s D[3] circular diagonal.

Finally, the links are physically reassigned to match the new link distribution of the expanded link matrix (step 505). In some implementations, the physical reassignment of links is conducted by the switch configuration system 210. For example, the switch configuration system 210 may be networked to (or electrically coupled) to the switches 206[0-S]. The switch configuration system 210 may then execute a computer program that results in the reconfiguration of the links between the switches' 206[0-S] superblock facing ports and spineblock facing ports.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A system for reassigning and implementing communication links in a network, the network including a plurality of first stage nodes connected through a plurality of switches by a set number of communication links to a plurality of second stage nodes, the system comprising:
   a memory to store processor-executable instructions; and
   a processing unit coupled to the memory, wherein execution of the processor-executable instructions by the processing unit causes the processing unit to:
      receive a request to expand a network by at least one node, the network having a first link distribution defined by a first link matrix having a plurality of circular diagonals;
      determine a second link distribution defined by a second link matrix;
   wherein the second link matrix has a plurality of circular diagonals;
      remap a first subset of the communication links associated with each of the first link matrix's plurality of circular diagonals to the second link matrix's plurality of circular diagonals, leaving a second subset of the communication links unmapped;
      remap the second subset of communication links to a single circular diagonal of the of the second link matrix; and
      implement the set number of communication links of the network responsive to the second link configuration matrix.

2. The system of claim 1, wherein the second link distribution distributes the set number of communication links substantially evenly across the network and the at least one node.

3. The system of claim 2, wherein the substantially even distribution of the set number of communication links results in each of the cells of the second link matrix having a number of communication links or the first number of communication links plus one additional communication link.

4. The system of claim 3, wherein the cells having a value of the first number of communication links plus one additional communication link are along a main diagonal of the second link matrix.

5. The system of claim 1, wherein the values in each of the plurality circular diagonals of the second link matrix are the same.

6. The system of claim 1, wherein each column and row the first and second link matrices sum to the set number of communication links.

7. A computer implemented method for reassigning and implementing communication links in a network, the network including a plurality of first stage nodes connected through a plurality of switches by a set number of communication links to a plurality of second stage nodes, the method comprising:

receiving a request to expand a network by at least one node, the network having a first link distribution defined by a first link matrix having a plurality of circular diagonals;

determining a second link distribution defined by a second link matrix; wherein the second link matrix has a plurality of circular diagonals;

remapping a first subset of the communication links associated with each of the first link matrix's plurality of circular diagonals to the second link matrix's plurality of circular diagonals, leaving a second subset of the communication links unmapped;

remapping the second subset of communication links to a single circular diagonal of the of the second link matrix; and implementing the set number of communication links of the network responsive to the second link configuration matrix.

8. The method of claim 7, wherein the second link distribution distributes the set number of communication links substantially evenly across the network and the at least one node.

9. The method of claim 8, wherein the substantially even distribution of the set number of communication links results in each of the cells of the second link matrix having a number of communication links or the first number of communication links plus one additional communication link.

10. The method of claim 9, wherein the cells having a value of the first number of communication links plus one additional communication link are along a main diagonal of the second link matrix.

11. The method of claim 7, wherein the values in each of the plurality circular diagonals of the second link matrix are the same.

12. The method of claim 7, wherein each column and row the first and second link matrices sum to the set number of communication links.

13. A non-transitory computer readable storage medium having instructions encoded thereon which, when executed by a processor, cause the processor to perform a of reassigning and implementing communication links in a network, the network including a plurality of first stage nodes connected through a plurality of switches by a set number of communication links to a plurality of second stage nodes, the method comprising:

receive a request to expand a network by at least one node, the network having a first link distribution defined by a first link matrix having a plurality of circular diagonals;

determine a second link distribution defined by a second link matrix; wherein the second link matrix has a plurality of circular diagonals;

remap a first subset of the communication links associated with each of the first link matrix's plurality of circular diagonals to the second link matrix's plurality of circular diagonals, leaving a second subset of the communication links unmapped;

remap the second subset of communication links to a single circular diagonal of the of the second link matrix; and implement the set number of communication links of the network responsive to the second link configuration matrix.

14. The non-transitory computer readable storage medium of claim 13, wherein the second link distribution distributes the set number of communication links substantially evenly across the network and the at least one node.

15. The non-transitory computer readable storage medium of claim 14, wherein the substantially even distribution of the set number of communication links results in each of the cells of the second link matrix having a number of communication links or the first number of communication links plus one additional communication link.

16. The non-transitory computer readable storage medium of claim 15, wherein the cells having a value of the first number of communication links plus one additional communication link are along a main diagonal of the second link matrix.

17. The non-transitory computer readable storage medium of claim 13, wherein the values in each of the plurality circular diagonals of the second link matrix are the same.

18. The non-transitory computer readable storage medium of claim 13, wherein each column and row the first and second link matrices sum to the set number of communication links.

* * * * *